Nov. 17, 1970 M. AVEN 3,541,375

BARRIER LAYER ELECTROLUMINESCENT DEVICES

Filed June 7, 1967

Inventor:
Manuel Aven,
by John F. Ahern
His Attorney.

United States Patent Office — 3,541,375 — Patented Nov. 17, 1970

3,541,375

BARRIER LAYER ELECTROLUMINESCENT DEVICES

Manuel Aven, Burnt Hills, N.Y., assignor to General Electric Company, a corporation of New York Continuation-in-part of application Ser. No. 518,313, Jan. 3, 1966. This application June 7, 1967, Ser. No. 644,305
Int. Cl. H01j *1/62, 63/04*
U.S. Cl. 313—108 10 Claims

ABSTRACT OF THE DISCLOSURE

A junction electroluminescent device includes three superposed layers comprising different conductivity regions. A first region includes a host compound of a Group II–VI material having a rare earth material therein as a donor and exhibits n-type conductivity characteristics. A second region adjacent said first region includes the rare earth material and an acceptor material which coacts with the rare earth material to form centers of luminescence. A third region superposed upon the second region may be a p-type conductivity compound of the Group I–VI or Group II–VI materials or may be a simple hole-injecting, high work function metal. Upon the application of a forward bias, holes are injected from the third region into the second region and cause a radiative transition at the rare earth-acceptor activation center, resulting in emission of light, the wavelength of which is characteristics of the rare earth donor impurity.

Figure 1:
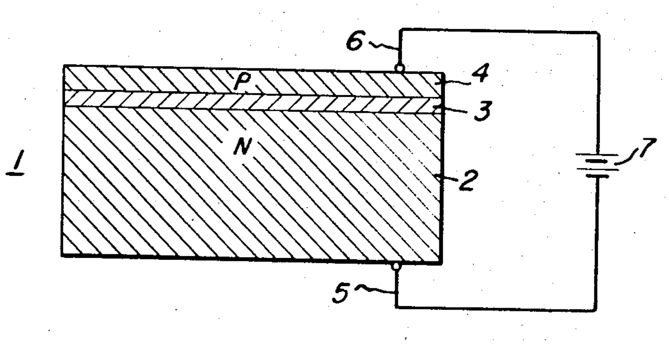

The present application is a continuation-in-part of my copending application, Ser. No. 518,313 filed Jan. 3, 1966, and assigned to the present assignee. This invention relates to improved electroluminescent devices wherein electromagnetic radiation is emitted from a junction upon the application of an electric field thereto.

In the copending application of Prener and Kingsley, Ser. No. 518,311, filed Jan. 3, 1966, there is disclosed and claimed a system of phosphors for the production of narrow band electromagnetic radiation lying at selectable wavelengths throughout the electromagnetic spectrum. These materials are of significant value in the general field of light emission including such applications as flashlamps, television screen phosphors, luminescent devices and lasers. However, in the latter two categories, it is of particular interest to provide a device to which energy can be applied in a more convenient manner than through excitation by cathode or ultraviolet rays.

Accordingly, it is an object of the present invention to provide a new and improved electroluminescent device wherein the light emitted thereby is largely determined by the activator impurity.

Another object of this invention is the provision of a new and improved electroluminescent device which emits a singular narrow band of electromagnetic radiation in response to an applied electric field excitation.

A further object of the present invention is the provision of a new and improved junction electroluminescent device which is adapted to produce a highly concentrated output beam of electromagnetic radiation in response to applied electric field excitation.

Finally, it is an object of this invention to provide a new and improved semiconductive laser device.

Briefly, in accord with one embodiment of the present invention, I provide an improved electroluminescent device comprising a first region of crystalline host material selected from the class generally known as the II–VI compounds including the chalcogenides of zinc, cadmium and mixtures thereof, and which contains a rare earth metal as a donor therein and exhibits n-type conductivity. The device further includes a second, junction region, adjacent to the first region which also comprises a II–VI host compound and which includes an element selected from Group I, and preferably Group I–b of the Periodic Table and a rare earth element, these elements being included as impurities in the II–VI compound and forming centers of luminescence. A third region is also provided comprising a material capable of injecting holes into the aforementioned second region. This third region may comprise a p-type region of II–VI host material, a crystalline material selected from the class known as the I–VI compounds or another hole-injecting material such a as a high work function metal. The Group I element in the case of the I–VI compound region is conveniently the same as the Group I impurity in the second region. Finally, the device includes non-rectifying electrical terminals connected to the n-type and to the hole-injecting material and comprising means for applying a forward bias to the junction region.

Figure 2:
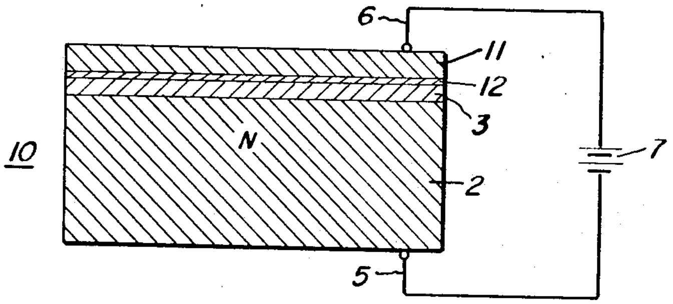

The novel features believed characteristic of the present invention are set forth in the appended claims. The invention itself, together with further objects and advantages thereof, may best be understood by reference to the following description, taken in connection with the appended drawings, in which:

FIG. 1 is a schematic illustration in vertical cross-section of an electroluminescent device constructed in accord with the present invention; and FIG. 2 is a schematic illustration in vertical cross-section of an alternative device constructed in accord with the present invention.

In FIG. 1 of the drawing, an electroluminescent device, represented generally at 1, includes a region 2 of a II–VI host phosphor compound such as any member of the zinc-cadmium sulfo-selenide family of phosphors comprising zinc and/or cadmium as a cation and oxygen, or one or more of sulphur, selenium and tellurium as an anion. The region 2 is provided with n-type conductivity by doping with a suitable rare earth impurity. The donor is unique in that it not only serves to render region 2 n-type, but also the rare earth element serves as an activator impurity in the junction region of the device. Superposed upon n-type region 2 is a region 3 which also comprises a II–VI host phosphor compound, usually the same compound as region 2. Region 3 contains the activator impurities which are capable of producing electromagnetic radiation, namely, an element selected from Group I of the Periodic Table and the aforementioned rare earth element. The thickness of region 3 is not critical, but generally lies in the range of 1 to 10 microns and contains therein a p-n junction.

Superposed upon region 3 is a region 4 of the device which comprises a material for injecting holes into region 3 for recombination with electrons from region 2. This recombination produces electroluminescene. The region may comprise, in a first embodiment, the same II–VI compound as region 2, but now converted to p-type conductivity. For example, the mixed crystal material $$ZnSe_xTe_{1-x}$$

where $x$ may vary from approximately 0.1 to 0.7, is suitable if both regions 2 and 4 are to be of the same material, since it can be made both n- and p-type. Alternatively, region 4 may comprise a different II–VI material; a compound selected from the class of I–VI compounds, or chalcogenides, such as cuprous selenide; or a high work function metal. Each of these classes of materials functions as a hole-injecting component for the device.

It is most convenient to use a single rare earth as the donor in region 3; it is also most expedient, in the case of the I–VI hole-injector, that the Group VI element in region 4 be the same as the Group VI element in regions 2 and 3. However, in each case, differeing elements may be used without departing from the spirit of this invention. The rare earth materials utilized are all from the lanthanide series of rare earths and must be such that, when incorporated in the crystal lattice structure of a II–VI compound, they exist in the trivalent state. Thus for example samarium and europium, which are divalent in the II–VI lattice, are not suitable.

More specifically, the rare earth material utilized as donor-activator is determined by the host lattice and the sensitizer, or acceptor, utilized. In generating electroluminescent radiation in accord with the invention, the sensitizer atom transfers energy, derived, for example, from an electron-hole recombination, to the associated rare earth activator which emits its characteristic radiation. Thus, for example, the ZnS:Cu system may transfer energy to Tb, Pr, Nd, Dy, Ho, Er, and Tm, either solely or in combination as activators in the lattice of a II–VI compound. Likewise, the following systems:

$$ZnSe_xTe_{(1-x)}:Ag$$

or:Li; ZnTe:Ag; and ZnTe:Li may transfer energy to Er, Ho and Nd, either solely or in combination.

Nonrectifying electrical terminals are connected to each of regions 2 and 4 to provide for the application of an electric field to forward bias junction region 3. An electrode 5 such as indium may be evaporated onto, or fused to, the n-type region 2 and a metallic terminal 6 may be attached to the p-type region 4. It is desirable, if light is to emerge through a particular surface of the device, that the remaining surfaces be polished and/or coated with a reflecting layer so as to internally reflect light, as in the case of a laser. If it is desired to emit through an electrode, that electrode should be transmissive to the wavelength of light emitted by the device, for example by utilizing a layer of titanium dioxide.

In the embodiment of the invention in which device 1 is to function as an injection laser, a pair of lateral surfaces, perpendicular to the plane of junction region 3, are made substantially optically parallel to one another and polished to optical smoothness. Both surfaces are coated, one surface preferably being coated to possess substantially complete reflecting characteristics to the emission wavelength characteristic of the system utilized. The other polished surface is preferably coated so as to be partially reflective and partially transmissive to the same wavelength. The polished surfaces are located at an appropriate distance from one another, preferably an integral number of half wavelengths of the emitted radiation, so as to facilitate the establishment of a standing wave of electromagnetic radiation at the emission frequency therein. Population inversion is achieved by causing voltage source 7 to apply a pulse of high voltage between regions 2 and 4, resulting in the emission of stimulated coherent radiation through the partially reflective coated lateral surface of device 1. A suitable structure to achieve this mode of operation may be found, for example, in Pat. No. 3,245,002 to R. N. Hall.

Since the device 1, in each case, includes a hole-injection region 4 and an n-type region 2, the device effectively includes a p-n junction region. The precise location, i.e. the location within region 3, where the majority carriers change from electrons to holes, is not critical to the present invention, although it does exist at some point within region 3. Since region 3 is the light emitting region, and is a region containing activator sites, i.e. sites at which an activator and one or more sensitizing atoms are closely juxtaposed, it is bordered on the edge facing region 4 by region 4 itself, the hole-injecting region. Since there is generally a decreasing concentration of activator sites away from region 4 and into region 2, the other boundary of region 3 is set by the statistical depth that an injected hole may penetrate. This region will, for convenience, be denominated as a junction region. As with any junction region its conductivity varies from one conductivity type to another. If it is exactly compensated over its entire width, the junction is a P–I–N junction rather than a p-n junction.

The preparation of the devices illustrated in FIG. 1 first requires preparation of a single crystal of II–VI material, for example by the method of vapor transport described and claimed in Piper Pat. No. 3,243,267. In general, the impurities required to form regions 2 and 3 can be incorporated either during or after crystal growth. The method of preparation of region 4 required depends on the embodiment sought.

If a single crystal of a given II–VI material is to include the three regions, it is most convenient to prepare a crystal of the II–VI phosphor containing a Group I impurity which functions as an acceptor and sensitizer, and thus produces p-type conductivity, and to convert a portion thereof to n-type conductivity by evaporating a layer of rare earth onto one surface and heating in an atmosphere of the Group II element to diffuse in the rare earth. The rare earth is included in an amount sufficient to convert region 2 to n-type conductivity and, at the inner extremity of its diffusion, to produce activated and sensitized regions 3 including approximately balanced amounts of the Group I element and the rare earth. The diffusion is controlled so that it may be stopped when the rare earth has proceeded to the proper depth and the junction or emission region 3 includes a sufficient quantity of the rare earth. As an example of this, a suitable device is one in which region 4 is $ZnSe_{0.3}Te_{0.7}$:Cu; region 3 is $$ZnSe_{0.3}Te_{0.7}:CuNd$$

the neodymium and copper being present in equal parts; and region 2 is $ZnSe_{0.3}Te_{0.7}$:NdCu, the neodymium being present in much greater quantity than the copper so that the presence of copper therein is ineffective.

In the remaining embodiments of this invention, it is preferred to prepare the II–VI crystal including regions 2 and 3 and subsequently add the region 4 thereto. In more detail, the II–VI crystal is grown, for example, by the aforementioned vapor transport method, and a suitable trivalent (when incorporated therein) lanthanide series rare earth impurity to produce n-type region 2 is introduced. When the rare earth impurity is provided as the crystal is grown, it is added to the charge from which the crystal is grown. The rare earth donor in the resultant crystal, as grown, in the case of some materials such as zinc selenide, cadmium telluride, may be compensated by vacancies of zinc or cadmium, as the case may be. In these cases, the crystal is converted to n-type conductivity by firing in zinc or cadmium to fill the vacancies, as is well known to those skilled in the art. The rare earth is distributed in regions 2 and 3, thus serving as a donor in region 2 and, due to sensitization by the Group I element, as center of activation in region 2. Alternatively, the rare earth element may be introduced by diffusing the element uniformly throughout the crystal, after growth.

The desired Group I impurity is now introduced by coating a surface of the crystal with a thin film of a compound containing a Group I element, for example, a copper gold or silver chalcogenide. This may accomplished by evaporation, or by chemical reaction as set forth, for example, in the application of D. A. Cusano, Ser. No. 409,832, filed Nov. 9, 1964, and assigned to the assignee of the present invention. The crystal is then heated for a time usually ranging from 10 to 30 seconds at temperatures between 300° C. and 400° C. This treatment causes a small amount of copper to diffuse into the crystal and produce therein a 1-to-5 micron thick copper-doped region. Since copper diffuses much more rapidly than the rare earth elements, the rare earth impurity already included is not removed from this region during this operation.

If the final device is to include a I–VI layer as the hole-injection region, the device is now complete since the I–VI layer from which the Group I impurity is introduced is suitable for use as the hole-injection region.

If it is desired to provide a different II–VI compound as region 4, the film of Group I-containing compound is dissolved off, for example in potassium cyanide, and the desired II–VI compound is deposited on region 3 and doped with an appropriate acceptor. For example, this procedure might be followed to combine a strongly n-type II–VI compound such as cadmium selenide or zinc selenide with a strongly p-type II–VI compound such as zinc telluride. Thus the devices of the invention contain three essential regions, an n-type region, a light-emitting junction region, and a hole-injecting region.

Electrical terminals 5 and 6 are now connected to regions 2 and 4. Upon the application of a unidirectional or alternating voltage to these contacts, biasing junction region 3 in the forward direction, high intensity light is produced from the Group I, rare earth doped region 3. The radiation produced arises from the phenomenon known as recombination of electrons and holes within the crystal. In the case of a unidirectional voltage, a forward bias is applied to the p-n junction so that holes are injected from the layer 4 into the copper diffused region where they recombine with electrons supplied by the n-type II–VI compound crystal. In the case of an alternating voltage, the device emits light during the half cycle of forward bias; therefore, this mode of operation is suitable to produce a pulsed output. The value of the applied voltage is usually of the order of 10 volts, and need only be sufficient to effect counter-diffusion of electrons and holes from respective electrodes to the recombination region. The particular value in any case depends on the thickness of the material, the conductivity and the output desired.

In accord with the aforementioned application of Prener and Kingsley, the system of phosphors including the II–VI compounds and the Group I and rare earth impurities, in the quantities stated therein, provide a wide seelction of alternate emission wavelengths. The permissible outputs are further increased by the option of providing more than one of any of the various constituents, if desired. The present invention also contemplates the use of any of these materials and further embodies the advantage of a more efficient collection of the applied energy and that of a more readily controlled and adjusted energy source. Devices in accord with the invention differ from other junction electroluminescent devices of the prior art in at least two important features. Firstly, the emission of light is due to the transfer of energy to the rare earth activator from the sensitizer and the subsequent emission of light having a wavelength characteristic of the rare earth atom. The only influence upon the emitted radiation exerted by the host lattice is to impose a maximum upon the energy thereof, so that the greatest energy transition permitted by the host lattice and the sensitizer is the shortest wavelength emission permitted. Within this limit the radiation is characteristic solely of the rare earth. This is as contrasted to conventional electroluminescence, wherein the wavelength emission is determined by the relationship of, and interaction with the host lattice.

Secondly, in the present invention, a single species, namely the rare earth, has the dual function of both providing the conductivity-determining characteristic to the host lattice and serving as the activator and wavelength-selector for electroluminescence.

In devices in accord with the invention, for example, the II–VI compound may be a simple compound such as ZnS, ZnSe or CdTe, or it may comprise a mixed crystal such as $ZnSe_xTe_{1-x}$ or $Zn_xCd_{1-x}S$ where, in the first case, $x$ has a value between 0.2 and 0.7. A single rare earth element such as holmium, erbium, or neodymium, among others, as set forth hereinbefore, may be included as the impurity or a combination of rare earths may be included to produce a desired color composite, or white.

The concentration of rare earth donor impurity included within region 2 of the device of FIG. 1 is, within limits, not critical to the present invention, the prime requirement being that sufficient donor impurity being included to convert the region to n-type conductivity. This may be accomplished by including an amount of donor impurity in the range, for example $10^{16}$ to $10^{19}$ atoms per cubic centimeter. However, as is more fully set forth in the aforementioned copending application of Prener and Kingsley, the disclosure of which is incorporated herewith by reference, the impurity concentration within region 3 of this device is of importance if the enhanced radiation and selectability of wavelength are to be achieved. Specifically, in accord with that invention, the rare earth and Group I*b* impurities should each be included in an amount ranging between $10^{-6}$ and $10^{-2}$ mole fraction in order to achieve enhanced radiation, selectability of wavelength and the large number of visible, infrared or ultraviolet choices. The mole fraction is a quantity which expresses the number of atoms of the impurity present for each molecule of the composition. In accord with the present invention, however, these quantities should be within a factor of 10 of one another, since the enhancement of the emission has been found to be greatly improved within this region, due to the requirement that both be present to provide a center of activation. It is noted that this range is smaller than in the case of the phosphors described by Prener and Kingsley, since, if the quantities differ by an excessive amount, the emission is markedly decreased. Accordingly, the above-described introduction of impurities, either in the growth of the crystal or by diffusion, is carried out in a manner well known to those skilled in the art to produce doping levels within these limits.

An alternative embodiment of this invention is illustrated in FIG. 2 which comprises an electroluminescent device 10 having regions 2 and 3 corresponding to those described in relation to FIG. 1. In this case, the hole-injection is accomplished by means of region 11 comprising a layer of a material having a high work function, such as gold, platinum or iridium. In this case, it is preferred that an intermediate insulating layer 12 of a material, such as aluminum trioxide or silicon monoxide, be included to accomplish the retardation of electron injection from region 3 into the metallic layer 11. The insulating layer is to be thin enough to allow the transmission of holes by the mechanism of quantum mechanical tunneling (i.e. between approximately 10 and 100 angstroms).

The preparation of regions 2 and 3 of this device is the same as that described in connection with the embodiment including an I–VI hole-injecting material. In this case, however, after the copper is diffused in to form region 3, the thin film of the compound containing the I element is removed, for example by etching in potassium cyanide in the case of a copper chalcogenide. The layer 12 of insulating material may then be deposited or coated on the exposed surface. The high work function material is then deposited, either on layer 12 or directly on the surface of region 3.

The operation of the device of FIG. 2 is identical to that of FIG. 1. The region 11 functions as a source of holes for the device. Under forward bias applied across the contacts 5 and 6, holes are injected from region 11 to recombine with the electrons derived from the n-type region 2 and produce electromagnetic radiation from region 3.

It is noted that the material of region 11 functions in the same manner as a p-type region of the embodiments of FIGS. 1 and 2; that is, it provides a source of holes for recombination. Therefore, the device of FIG. 2 includes an effective p-n junction between region 2 and region 11 and the phrase "effective junction" as used herein is intended to include this embodiment.

While I have shown and described several embodiments of my invention, it will be apparent to those skilled in the art that many changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. A junction electroluminescent device for producing line emission of electromagnetic radiation at a selected wavelength comprising a monocrystalline body having.

(a) a first region of N-type conductivity material consisting essentially of a host composed of a cation selected from the group consisting of zinc and cadmium, an anion selected from the group consisting of oxygen, sulfur, selenium, and tellurim, and a trivalent rare earth donor of the lanthanide series;

(b) a second region superposed upon said first region and consisting essentically of said host material an acceptor element selected from the group consisting of copper, silver, gold, and lithium and a donor activator impurity, selected from said rare earths; said donor and acceptor combining to form centers of activation;

(c) a third region superposed upon said second region and comprising a hole-injecting material for supplying p-type carriers to said second region when forward bias is applied to said first and second regions, to cause said centers of activation to become activated and emit narrow radiation at said preselected wavelength;

(d) said preselected wavelength radiation being characteristic of said selected rare earth, and (e) means applying a forward bias to said second region to cause the emission of narrow wavelength emission therefrom, which emission is characteristic of said rare earth donor.

2. An electroluminescent device as claimed in claim 1 wherein said third region comprises a layer of p-type conductivity material consisting essentially of said host material and an acceptor impurity.

3. An electroluminescent device as claimed in claim 2 wherein said host material of said third region is the same as the host material of said first region.

4. An electroluminescent device as claimed in claim 3 wherein said device comprises a single crystal of said host material including said three regions.

5. An electroluminescent device as claimed in claim 1 wherein said third region comprises a layer of a material consisting essentially of a host material composed of a cation selected from the group consisting of copper, silver, and gold and an anion selected from the group consisting of oxygen, sulfur, selenium, and tellurium.

6. An electroluminescent device as claimed in claim 1 wherein said third region comprises a high work function metal, said device also including an insulating layer interposed between said third region and said second region, said insulating layer being of a thickness to retard electron flow into said metal while permitting positive carrier quantum mechanical tunneling into said second region.

7. An electroluminescent device as claimed in claim 1 wherein said second region includes a rare earth element selected from the group consisting of terbium, praseodymium, neodymium, dysprosium, holmium, erbium, and thulium.

8. An electroluminescent device as claimed in claim 1 wherein the quantities of said acceptor element and said rare earth element in said second region are in the range $10^{-6}$ to $10^{-2}$ mole fraction and the concentrations of said rare earth and said acceptor element are substantially equal to within a factor of 10.

9. The device of claim 7 wherein the material in said third region is selected from the group consisting of zinc telluride: silver, zinc selenide: copper and zinc telluride: lithium, zinc seleno-telluride: silver, zinc seleno-telluride: lithium and the material in said first region consists essentially of a cation selected from the group consisting of zinc and cadmium and an anion selected from the group consisting of oxygen, sulfur, selenium, and tellurium doped with a rare earth selected from the group consisting of erbium, holmium, and neodymium.

10. The device of claim 1 wherein a pair of edge surfaces perpendicular to the plane of said second region are made optically parallel and are polished to optical smoothness and reflectively coated so as to form a resonant cavity including region 3 for the production of stimulated coherent optical emission therefrom upon the application of a pulse of high voltage to said first and second regions biasing said third region in the forward direction.

References Cited

UNITED STATES PATENTS

| | | |
|---|---|---|
| 3,245,002 | 4/1966 | Hall. |
| 3,267,294 | 8/1966 | Dumke et al. |
| 3,267,317 | 8/1966 | Fischer. |
| 3,269,956 | 8/1966 | Larach et al. |
| 3,281,714 | 10/1966 | Haering et al. |
| 3,290,175 | 12/1966 | Cusano et al. |
| 3,305,486 | 2/1967 | Prener et al. |
| 3,330,983 | 7/1967 | Cusano et al. |
| 3,333,135 | 7/1967 | Galginaitis. |
| 3,343,026 | 9/1967 | Luechinger et al. |

ROBERT SEGAL, Primary Examiner

U.S. Cl. X.R.

317—234